United States Patent
Nakano et al.

(10) Patent No.: US 9,453,574 B2
(45) Date of Patent: Sep. 27, 2016

(54) AUTOMATIC TRANSMISSION EQUIPPED WITH FRICTION ELEMENT HAVING LOCKING MECHANISM ATTACHED THERETO, AND CONTROL METHOD THEREFOR

(71) Applicant: JATCO Ltd, Fuji-shi, Shizuoka (JP)

(72) Inventors: Yusuke Nakano, Yamato (JP); Katsuya Kobayashi, Yokohama (JP); Kouzi Matsumoto, Yokohama (JP); Tomomasa Ikeda, Sagamihara (JP)

(73) Assignee: JATCO LTD, Fuji-Shi (JP)

( * ) Notice: Subject to any disclaimer, the term of this patent is extended or adjusted under 35 U.S.C. 154(b) by 23 days.

(21) Appl. No.: 14/430,457

(22) PCT Filed: Sep. 10, 2013

(86) PCT No.: PCT/JP2013/074372
§ 371 (c)(1),
(2) Date: Mar. 23, 2015

(87) PCT Pub. No.: WO2014/050540
PCT Pub. Date: Apr. 3, 2014

(65) Prior Publication Data
US 2015/0247569 A1 Sep. 3, 2015

(30) Foreign Application Priority Data

Sep. 26, 2012 (JP) .................................. 2012-212182

(51) Int. Cl.
*F16H 61/02* (2006.01)
*F16H 61/18* (2006.01)
*F16H 63/30* (2006.01)
*F16H 63/34* (2006.01)
*F15B 15/26* (2006.01)
*F16D 25/10* (2006.01)
*F16D 48/10* (2006.01)
*F16H 61/00* (2006.01)

(52) U.S. Cl.
CPC ......... *F16H 61/0021* (2013.01); *F15B 15/261* (2013.01); *F16D 25/10* (2013.01); *F16D 48/10* (2013.01); *F16H 61/0213* (2013.01); *F16H 61/18* (2013.01); *F16H 63/3026* (2013.01); *F16H 63/34* (2013.01)

(58) Field of Classification Search
CPC ...................................................... F16D 48/10
See application file for complete search history.

(56) References Cited

U.S. PATENT DOCUMENTS

| 3,710,651 A * | 1/1973 | Marumo et al. ............. 477/160 |
| 7,025,707 B2 * | 4/2006 | Katakura ...................... 477/123 |

(Continued)

FOREIGN PATENT DOCUMENTS

| DE | 2540191 A1 | 3/1977 |
| JP | 07-012221 | 1/1995 |

(Continued)

*Primary Examiner* — Terry Chau
(74) *Attorney, Agent, or Firm* — Foley & Lardner LLP

(57) ABSTRACT

A transmission controller judges whether or not there was performed a specific shift operation where the mode of a transmission is alternately switched between a D-mode and a R-mode, and when it is judged that the specific shift operation was performed and when a forward clutch is engaged, the forward clutch is brought into an engaged state by supplying a hydraulic pressure lower than a lock pressure, with which a locking mechanism is brought into a locked state, to an ON-pressure piston chamber.

4 Claims, 5 Drawing Sheets

(56) References Cited

U.S. PATENT DOCUMENTS

| | | | |
|---|---|---|---|
| 7,487,865 B2* | 2/2009 | Stevenson | 192/106 F |
| 8,172,058 B2* | 5/2012 | Grochowski | F16D 25/0638 192/114 R |
| 8,875,863 B2* | 11/2014 | Nakano | F16D 25/0638 192/114 R |
| 2002/0034999 A1* | 3/2002 | Saito | 475/120 |
| 2002/0173406 A1* | 11/2002 | Murasugi et al. | 477/156 |
| 2008/0314711 A1 | 12/2008 | Jayaram et al. | |
| 2010/0179026 A1 | 7/2010 | Grochowski et al. | |
| 2012/0241280 A1 | 9/2012 | Nakano et al. | |
| 2013/0075222 A1* | 3/2013 | Ari | F16D 25/12 192/85.63 |
| 2015/0141189 A1* | 5/2015 | Nakano | F16D 23/12 475/116 |
| 2015/0247568 A1* | 9/2015 | Nakano | F16H 61/02 192/3.57 |
| 2015/0247570 A1* | 9/2015 | Nakano | F16D 25/0638 192/3.57 |

FOREIGN PATENT DOCUMENTS

| | | |
|---|---|---|
| JP | 2010-242852 | 10/2010 |
| JP | 2012-197851 | 10/2012 |

\* cited by examiner

AUTOMATIC TRANSMISSION EQUIPPED WITH FRICTION ELEMENT HAVING LOCKING MECHANISM ATTACHED THERETO, AND CONTROL METHOD THEREFOR

TECHNICAL FIELD

The present invention relates to control of an automatic transmission equipped with a friction element having a lock mechanism attached thereto.

BACKGROUND ART

A friction element operated with a hydraulic pressure is used as a clutch and a brake of an automatic transmission so as to join two coaxial members to each other (in the case of the clutch, the two coaxial members are both rotational elements, whereas in the case of the brake, one of the two coaxial members is a rotational element and the other is a non-rotational element) (JP 7-12221A).

In such a friction element, for example, the two members each have a plurality of friction plates attached thereto such that the friction plates are slidable in an axial direction, and the friction plates of the two members alternate. When the friction plates of the two members are pressed against one another by a hydraulic piston, the two members are joined to each other via the friction plates.

SUMMARY OF INVENTION

In order to maintain an engaged state of the aforementioned friction element, it is necessary to keep supplying a hydraulic pressure to the hydraulic piston by driving a hydraulic pump with an engine. This undesirably degrades the fuel economy of a vehicle equipped with an automatic transmission.

Accordingly, there is considered a configuration as follows: the hydraulic pressure is supplied until the friction element is engaged; after the friction element is engaged, the motion of the hydraulic piston is regulated by a locking mechanism; even if the hydraulic pressure is lowered, the friction element can maintain an engaged state. According to the configuration, the load of the hydraulic pump can be reduced and the fuel efficiency of a vehicle can be improved. It is preferred that the actuation and the cancellation of such a locking mechanism is performed by a hydraulic pressure.

However, when friction element with such a locking mechanism is used as friction element which is engaged during forward movement or backward movement, interlock can occur where the rotation of the input and output shaft of a transmission becomes impossible if there is performed a specific shift operation where switching between forward movement and backward movement is alternately made (for example, the operation of a select switch during garaging). The reason for this is explained as follows: when switching between forward movement and backward movement is done in a short amount of time, the cancellation of a locking mechanism is delayed due to the residual pressure of a hydraulic pressure for actuating the locking mechanism; this delays the release of the friction element with the locking mechanism, and other friction element is engaged before the friction element with the locking mechanism is released.

An object of the present invention is to prevent interlock from occurring in an automatic transmission even if there is performed a specific shift operation where switching between forward movement and backward movement is alternately made, in the automatic transmission provided with friction element with a locking mechanism.

According to a certain aspect of the present invention, there is provided an automatic transmission. The automatic transmission comprises: a first friction element, which is arranged in a power transmission path, and in which a locking mechanism is brought into a locked state when an ON-pressure is supplied to an engagement-side oil chamber, and in which an engaged state is maintained even if the hydraulic pressure of the engagement-side oil chamber is lowered when the locking mechanism has been brought into the locked state, and in which the locking mechanism is brought into an unlocked state when an OFF-pressure is supplied to a release-side oil chamber, and in which a released state is maintained even if the hydraulic pressure of the release-side oil chamber is lowered when the locking mechanism has been brought into the unlocked state; a second friction element, which is arranged in the power transmission path, and in which switching between an engaged state and a released state can be made by a hydraulic pressure, and in which interlock occurs in the automatic transmission if the first friction element and the second friction element are engaged simultaneously; a select switch that can select a first driving mode or a second driving mode, the traveling direction of which is opposite to that of the first driving mode, as the mode of the automatic transmission; and a control device, which engages the first friction element and releases the second friction element by controlling a hydraulic pressure supplied to the first friction element and the second friction element when the first driving mode is selected by the select switch, and which releases the first friction element and engages the second friction element by controlling a hydraulic pressure supplied to the first friction element and the second friction element when the second driving mode is selected by the select switch, wherein the control device determines whether or not there was performed a specific shift operation where the mode of the automatic transmission is alternately switched by the select switch between the first driving mode and the second driving mode, and when it is determined that the specific operation was performed, and when the first friction element is engaged, the first friction element is brought into an engaged state by supplying a hydraulic pressure, which is lower than a lock pressure with which the locking mechanism is brought into the locked state, to the engagement-side oil chamber. Moreover, there is provided a method for correspondingly controlling this automatic transmission.

According to the above aspect, when there was performed the specific shift operation where switching is alternately made between the first driving mode and the second driving mode, and when the first friction element is engaged, the first friction element is brought into the engaged state by supplying a hydraulic pressure lower than the lock pressure to the engagement-side oil chamber. Thereby, even if the mode of the transmission is switched to the second driving mode a short time after that, since the locking mechanism is not in the locked state, there arises no delay in the cancellation of the locking mechanism; the first friction element is released before the second friction element is engaged, which can prevent interlock from occurring in the transmission.

DESCRIPTION OF EMBODIMENT

The following describes an embodiment of the present invention with reference to the attached drawings.

Figure 1:
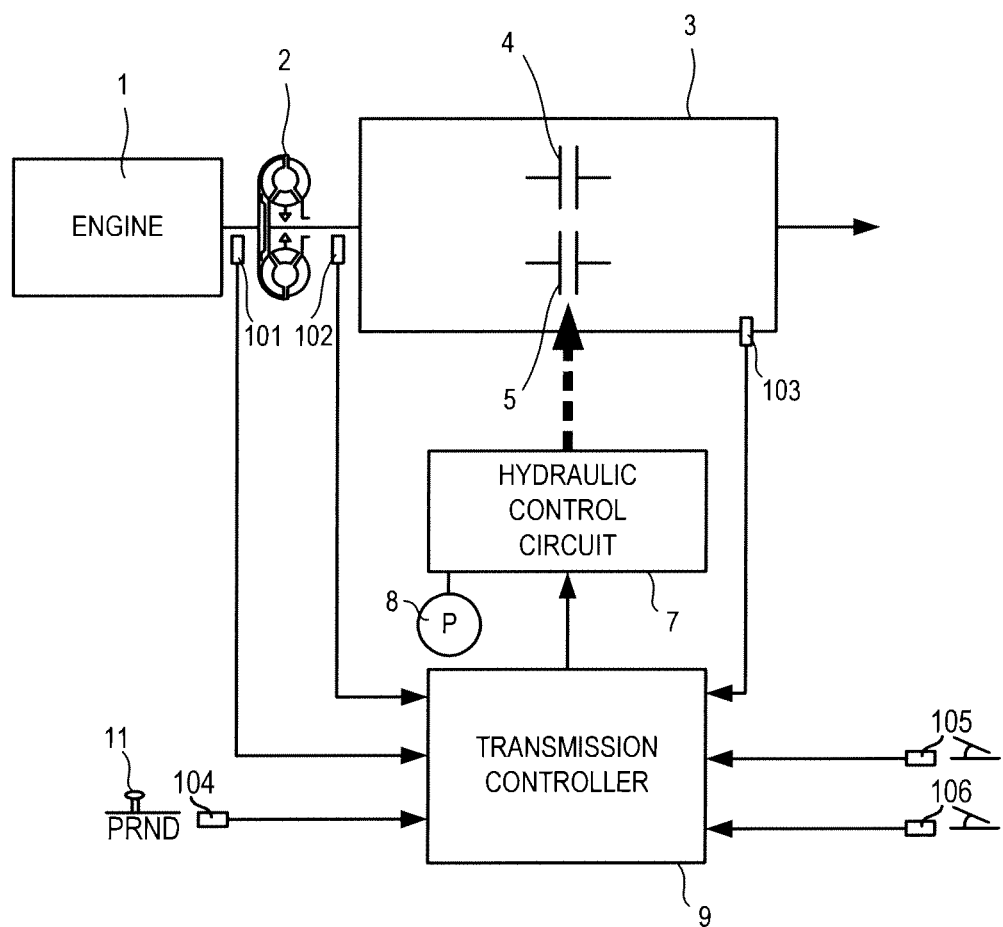
FIG. 1 is a schematic block diagram of a vehicle provided with an automatic transmission according to an embodiment of the present invention.

FIG. 1 shows a schematic configuration of a vehicle equipped with an automatic transmission according to the embodiment of the present invention. The vehicle includes an engine 1, a torque converter 2, and a transmission 3. An output rotation of the engine 1 is transmitted to unillustrated drive wheels via the torque converter 2, the transmission 3, and an unillustrated differential gear unit.

The transmission 3 is a step or continuously variable automatic transmission. The transmission 3 includes a reverse brake 4 and a forward clutch 5. In a state where the reverse brake 4 is engaged, the transmission 3 outputs the rotation of the engine 1 in reverse. In a state where the forward clutch 5 is engaged, the transmission 3 outputs the rotation of the engine 1 while maintaining its rotational direction.

The reverse brake 4 is a traditional friction element which is engaged through a supply of an engagement pressure, and which requires a continuous supply of the engagement pressure to maintain the engaged state thereof. The reverse brake 4 can be released by stopping the supply of the engagement pressure.

As will be described later, the forward clutch 5 is a friction element having a lock mechanism BL attached thereto. Once the lock mechanism BL has been placed in a locked state through a supply of an ON pressure to the forward clutch 5, the forward clutch 5 can be maintained in the engaged state even if the supply of the ON pressure is stopped. The forward clutch 5 can be released by placing the lock mechanism BL in a deactivated state through a supply of an OFF pressure to the forward clutch 5. Once the lock mechanism BL has been placed in the deactivated state, the forward clutch 5 can be maintained in the released state even if the supply of the OFF pressure is stopped. The configuration of the forward clutch 5 will be described later in detail.

Should both of the reverse brake 4 and the forward clutch 5 be engaged simultaneously, the transmission 3 will be placed in an interlocked state where an input/output shaft of the transmission 3 cannot rotate. Therefore, the reverse brake 4 and the forward clutch 5 are engaged in an alternating manner.

A hydraulic control circuit 7 includes a regulator valve, a solenoid valve, a hydraulic pump 8, and a hydraulic passage. The regulator valve adjusts a hydraulic pressure from the hydraulic pump 8, which is driven by the engine 1, to a line pressure. Using the line pressure as a source pressure, the solenoid valve adjusts a hydraulic pressure supplied to friction element, including the forward clutch 5 (and also to constituent elements of a continuously variable transmission mechanism in the case where the transmission 3 is a continuously variable transmission). The valves and friction element are connected to one another by the hydraulic passage.

Each valve of the hydraulic control circuit 7 is controlled based on a control signal from a transmission controller 9. The transmission controller 9 is composed of a CPU, a ROM, a RAM, an input/output interface, and the like. The transmission controller 9 determines a driving condition of the vehicle based on various types of signals input from various types of sensors and an engine controller, and outputs instructions to the hydraulic control circuit 7 so as to achieve a gear position (a speed ratio in the case where the transmission 3 is a continuously variable transmission) appropriate for the driving condition.

For example, the transmission controller 9 receives, as input, signals from rotational speed sensors 101, 102, 103, a mode detection switch 104, an accelerator pedal opening sensor 105, a brake switch 106, and the like. The rotational speed sensor 101 detects a rotational speed Ne of the engine 1. The rotational speed sensor 102 detects an input rotational speed of the transmission 3. The rotational speed sensor 103 detects an output rotational speed of the transmission 3. The mode detection switch 104 detects a mode of the transmission 3 selected by a select switch 11. The accelerator pedal opening sensor 105 detects an amount of operation on an accelerator pedal (hereinafter referred to as "accelerator pedal opening, APO"). The brake switch 106 detects ON/OFF of a brake.

The select switch 11 is lever-operated or button-operated. Operating a lever or buttons of the select switch 11 enables selection of one of the following modes as a mode of the transmission 3: a parking mode (hereinafter "P mode"), a reverse mode (hereinafter "R mode"), a neutral mode (hereinafter "N mode"), and a driving mode (hereinafter "D mode").

The transmission controller 9 causes each of the reverse brake 4 and the forward clutch 5 to be engaged or released in accordance with a mode selected by the select switch 11. Specifically, in the D mode, the reverse brake 4 is released and the forward clutch 5 is engaged. In the R mode, the reverse brake 4 is engaged and the forward clutch 5 is released. In the P mode and the N mode, the reverse brake 4 and the forward clutch 5 are released.

A description is now given of a detailed configuration of the forward clutch 5.

Figure 2:
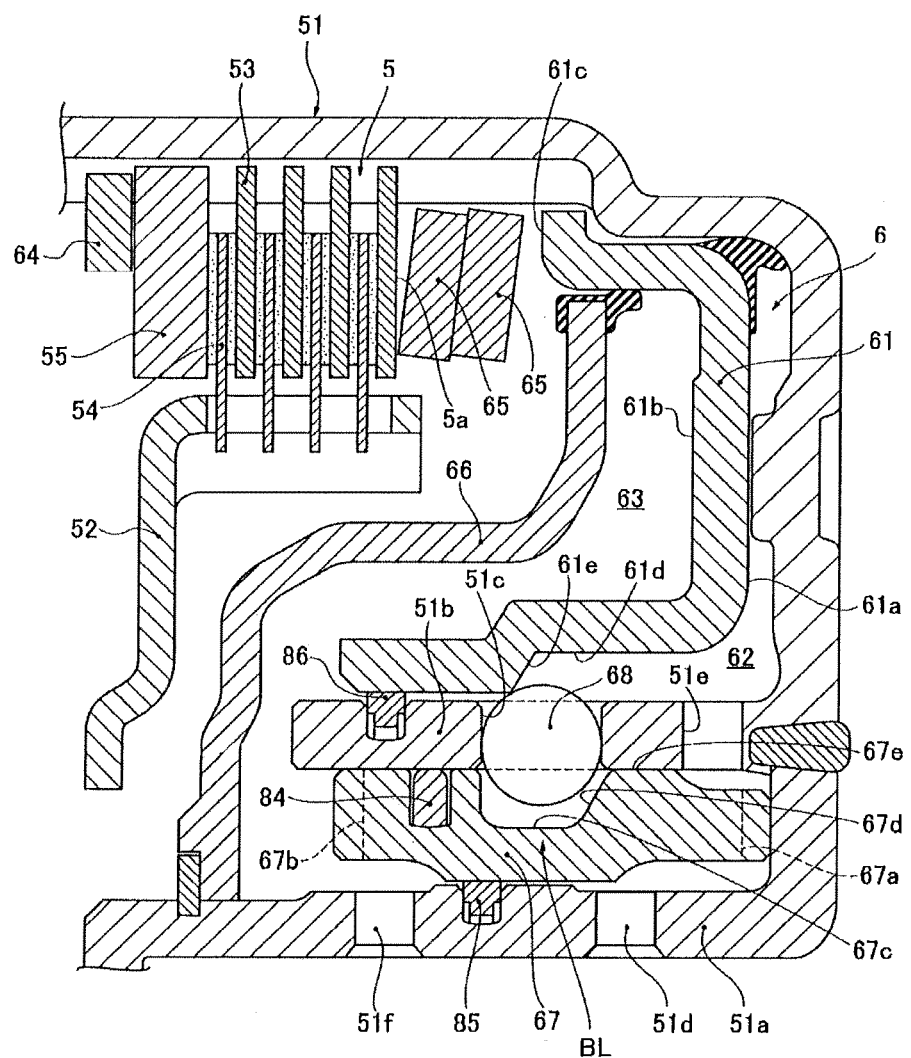
FIG. 2 is a cross sectional view of a forward clutch and a clutch operation pack that operates the forward clutch.

FIG. 2 is a cross-sectional view of the forward clutch 5 and a clutch operation pack 6 that causes the forward clutch 5 to operate. The configurations thereof will now be described.

The forward clutch 5 includes a clutch drum 51, a clutch hub 52, driven plates 53, drive plates 54, and a retainer plate 55.

The clutch drum 51 and the clutch hub 52 are arranged coaxially. Unillustrated rotational elements (a shaft, a gear, etc.) are joined to the clutch drum 51. Other unillustrated rotational elements (a shaft, a gear, etc.) are joined to the clutch hub 52.

The driven plates 53 are attached to the clutch drum 51 by means of a spline joint such that the driven plates 53 are slidable in an axial direction. The drive plates 54 are attached to the clutch hub 52 by means of a spline joint such that the drive plates 54 are slidable in the axial direction. Four driven plates 53 and four drive plates 54 are arranged alternately. The drive plates 54 have friction surfaces on both sides, and clutch facings are attached to the friction surfaces.

The clutch drum 51 transmits, to the clutch hub 52, the rotation input from the rotational elements joined to the clutch drum 51 via the driven plates 53 and the drive plates 54.

The retainer plate 55 is interposed between a retaining ring 64 and a drive plate 54 that is arranged at the end opposite to a hydraulic piston 61. The retaining ring 64 is fixed to a groove on the inner periphery of the clutch drum 51. The retainer plate 55 has a friction surface on one side. Furthermore, the retainer plate 55 has a larger thickness than the driven plates 53 in the axial direction, and prevents the driven plates 53 and the drive plates 54 from falling.

The clutch operation pack 6 includes the hydraulic piston 61, an ON pressure piston chamber 62, an OFF pressure piston chamber 63, the retaining ring 64, diaphragm springs 65, a partition plate 66, and the lock mechanism BL.

The hydraulic piston 61 is arranged such that it is displaceable in the axial direction relative to the forward clutch 5. The hydraulic piston 61 has an ON pressure receiving surface 61a on one side, and an OFF pressure receiving surface 61b on the other side.

The ON pressure piston chamber 62 is defined between the clutch drum 51 and the hydraulic piston 61 so as to cause the ON pressure to act on the ON pressure receiving surface 61a of the hydraulic piston 61.

The OFF pressure piston chamber 63 is defined between the partition plate 66, which is fixed to the clutch drum 51, and the hydraulic piston 61 so as to cause the OFF pressure to act on the OFF pressure receiving surface 61b of the hydraulic piston 61.

The retaining ring 64 is arranged in a position opposite to the hydraulic piston 61 with the forward clutch 5 therebetween, and supports the forward clutch 5 in the axial direction.

The diaphragm springs 65 are interposed between a clutch-side end surface 61c of the hydraulic piston 61 and a piston-side end surface 5a of the forward clutch 5. Two diaphragm springs 65 are arranged in such a manner that they are stacked in the axial direction. The diaphragm springs 65 exert an engaging force acting on the forward clutch 5 as a result of moving the hydraulic piston 61 in an engaging direction toward the retaining ring 64.

The lock mechanism BL is built in the clutch drum 51, and is composed of the hydraulic piston 61, a ball holding piston 67, and a ball 68.

The hydraulic piston 61 is arranged such that it is displaceable in the axial direction relative to the forward clutch 5. The hydraulic piston 61 has a housing part 61d and a tapered surface 61e. The housing part 61d houses the ball 68 when a movement of the hydraulic piston 61 in a releasing direction is restricted. The tapered surface 61e is formed continuously with the housing part 61d. At the time of a stroke movement of hydraulic piston 61 in the releasing direction, the tapered surface 61e pushes the ball 68 inward.

The ball holding piston 67 is arranged in a cylindrical space defined by a cylindrical inner periphery part 51a of the clutch drum 51 that covers the hydraulic piston 61 and by a cylindrical partition wall part 51b that projects from the clutch drum 51 in the axial direction. The ball holding piston 67 moves in the axial direction with the action of the ON pressure or the OFF pressure. A seal ring 84 seals between the outer peripheral surface of the ball holding piston 67 and the cylindrical partition wall part 51b. A seal ring 85 seals between the inner peripheral surface of the ball holding piston 67 and the cylindrical inner periphery part 51a. A seal ring 86 seals between the inner peripheral surface of the hydraulic piston 61 and the cylindrical partition wall part 51b. In this way, the ON pressure piston chamber 62 and the OFF pressure piston chamber 63 are defined on both sides of the hydraulic piston 61.

An ON pressure port 51d, which opens into the clutch drum 51, and the ON pressure piston chamber 62 communicate with each other via an ON pressure communication groove 67a formed in the ball holding piston 67 and via an ON pressure communication hole 51e, which is an opening through the cylindrical partition wall part 51b. An OFF pressure port 51f, which opens into the clutch drum 51, and the OFF pressure piston chamber 63 communicate with each other via an OFF pressure communication groove 67b formed in the ball holding piston 67 and via an OFF pressure communication clearance secured between an end portion of the cylindrical partition wall part 51b and the partition plate 66.

The ball holding piston 67 has a housing part 67c, a tapered surface 67d, and a lock surface 67e. The housing part 67c houses the ball 68 when a movement of the hydraulic piston 61 in the releasing direction is permitted. The tapered surface 67d and the lock surface 67e are formed continuously with the housing part 67c. At the time of a stroke movement of the ball holding piston 67 in a direction toward the forward clutch 5, the tapered surface 67d pushes the ball 68 outward, and the lock surface 67e locks the pushed ball 68 at a resultant position thereof.

The ball 68 is placed in a ball hole 51c, which is an opening through the cylindrical partition wall part 51b. The tapered surfaces 61e, 67d of the hydraulic piston 61 and the ball holding piston 67 apply a force to the ball 68 as the pistons 61, 67 move in the axial direction with the action of the ON pressure or the OFF pressure. Accordingly, the ball 68 moves in a radial direction between a lock position and a lock deactivation position.

According to the above-described configuration, the supply of the ON pressure to the ON pressure piston chamber 62 causes the hydraulic piston 61 to move in the engaging direction toward the forward clutch 5, thereby placing the forward clutch 5 in the engaged state with a pushing force of the diaphragm springs 65 that have been pushed and compressed. Upon the movement of the hydraulic piston 61 in the engaging direction, the ball 68 moves in a direction toward an outer diameter due to a rotation-induced centrifugal force and the hydraulic pressure. Consequently, the ball 68 is housed in the housing part 61d. As the ON pressure acts on the ball holding piston 67, the ball holding piston 67 moves in the axial direction (the direction toward the forward clutch 5), and the lock surface 67e holds the ball 68 held in the housing part 67c.

As a result, the lock mechanism BL is placed in the locked state. Accordingly, a movement of the hydraulic piston 61 in the releasing direction is restricted, and the engaged state of the forward clutch 5 is maintained even if the ON pressure is drained. The ON pressure is supplied to the ON pressure piston chamber 62 only during an engagement operation. It is not necessary to supply the ON pressure to maintain the engaged state of the forward clutch 5.

A lower limit value of the ON pressure with which the lock mechanism BL can be placed in the locked state is referred to as a lock pressure, and is determined uniquely based on a spring constant of the diaphragm springs 65, the area of the ON pressure receiving surface 61a of the hydraulic piston 61, and the like.

Furthermore, by supplying a hydraulic pressure lower than the lock pressure to the ON pressure piston chamber 62, the forward clutch 5 can be placed in the engaged state without placing the lock mechanism BL in the locked state.

In this case, as the lock mechanism BL cannot restrict a movement of the hydraulic piston 61 in the releasing direction, it is necessary to keep supplying the hydraulic pressure to the ON pressure piston chamber 62 to maintain the forward clutch 5 in the engaged state. Additionally, the transmission capacity of the forward clutch 5 at this time depends on the hydraulic pressure supplied to the ON pressure piston chamber 62.

The control of the transmission controller 9, where the locking mechanism BL is brought into the locked state by supplying and discharging the ON-pressure mentioned above and where thereby the forward clutch 5 is maintained in the engaged state, is called normal engagement control. On the other hand, the control of the transmission controller 9, where a hydraulic pressure lower than the lock pressure mentioned above is continuously supplied to the ON-pressure piston chamber 62 and where the forward clutch 5 is maintained in the engaged state with the locking mechanism BL not being brought into the locked state, is called specific-shift-operation engagement control. When the D-mode is selected by the select switch 11, the transmission controller 9 selects the normal engagement control or the specific-shift-operation engagement control according to whether or not the operation of the select switch 11 is the specific shift operation, and performs the selected control. The content on the control of the transmission controller 9 will be described in detail later.

Meanwhile, the supply of the OFF pressure to the OFF pressure piston chamber 63 causes the ball holding piston 67 to move in the axial direction (a direction away from the forward clutch 5), from the position in which the ball 68 is held by the lock surface 67e to the position in which holding of the ball 68 by the lock surface 67e is cancelled. A combination of a force of the OFF pressure and a reaction force opposing the engaging force exerted by the diaphragm springs 65 acts on the hydraulic piston 61. This results in a stroke movement of the hydraulic piston 61 in a return direction, thereby pushing the ball 68 back in a lock deactivation direction. Once the ball 68 has moved to the lock deactivation position, the lock mechanism BL is placed in the unlocked state, and the forward clutch 5 is released.

When the forward clutch 5 is released, the ON pressure is zero. This maintains a state where the ball 68 is housed in the housing part 67c of the ball holding piston 67 even if the OFF pressure is drained. The OFF pressure is supplied to the OFF pressure piston chamber 63 only during a release operation. It is not necessary to supply the OFF pressure to maintain the released state of the forward clutch 5.

When the locking mechanism BL is not in the locked state by the specific-shift-operation engagement control, it is unnecessary to supply and discharge the OFF-pressure mentioned above in order to release the clutch 5; with draining the hydraulic pressure of the ON-pressure piston chamber 62, the forward clutch 5 can be released.

The above-described control by the transmission controller 9 to maintain the forward clutch 5 in the released state by placing the lock mechanism BL in the unlocked state through the supply and discharge of the OFF pressure is referred to as normal release control. In contrast, control by the transmission controller 9 to release the forward clutch 5 by draining the hydraulic pressure in the ON pressure piston chamber 62 is referred to as unlocked state release control. When a mode other than the D mode is selected by the select switch 11, the transmission controller 9 performs the normal release control or the unlocked state release control depending on whether the lock mechanism BL is in the locked state. The substance of control by the transmission controller 9 will be described later in detail.

Figure 3:
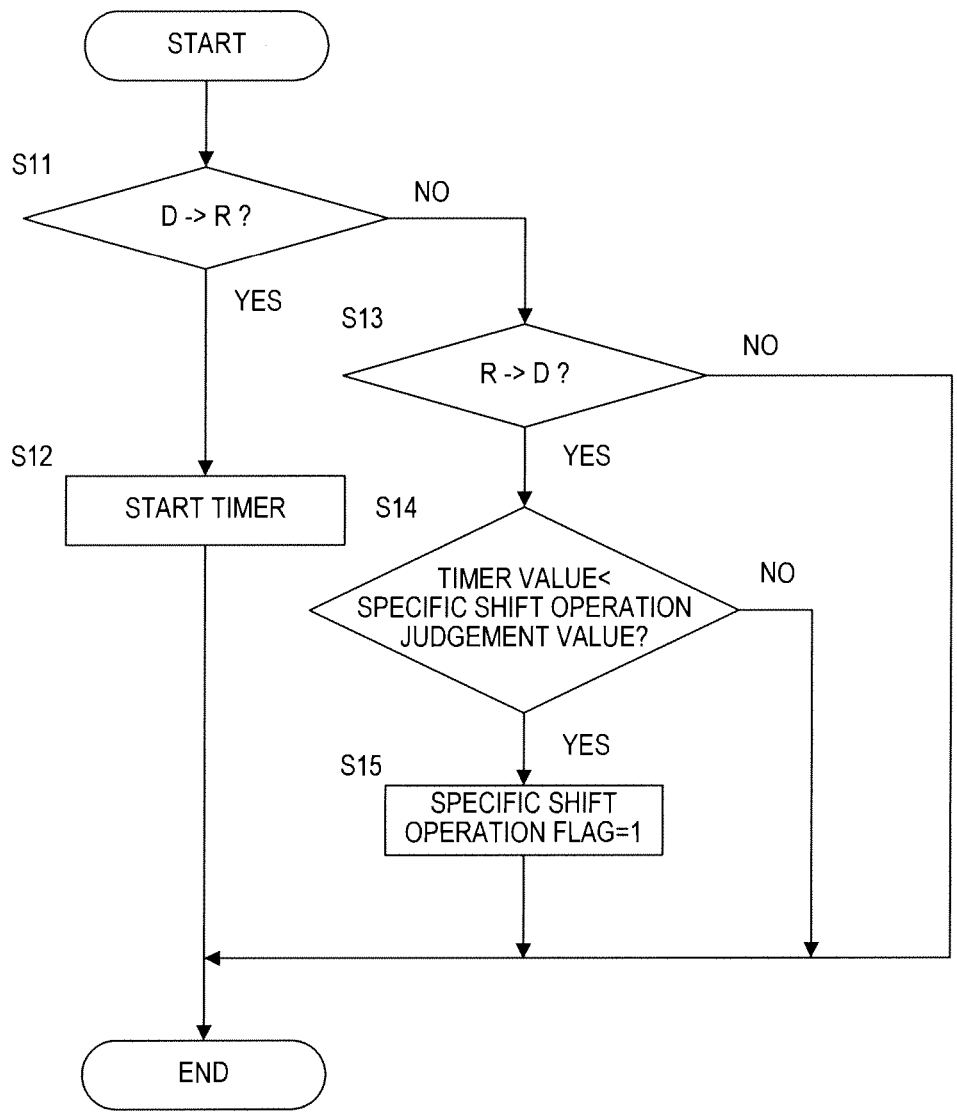
FIG. 3 is a flow chart showing the substance of judgment processing judging the start of a specific shift operation and which a transmission controller performs.
Figure 4:
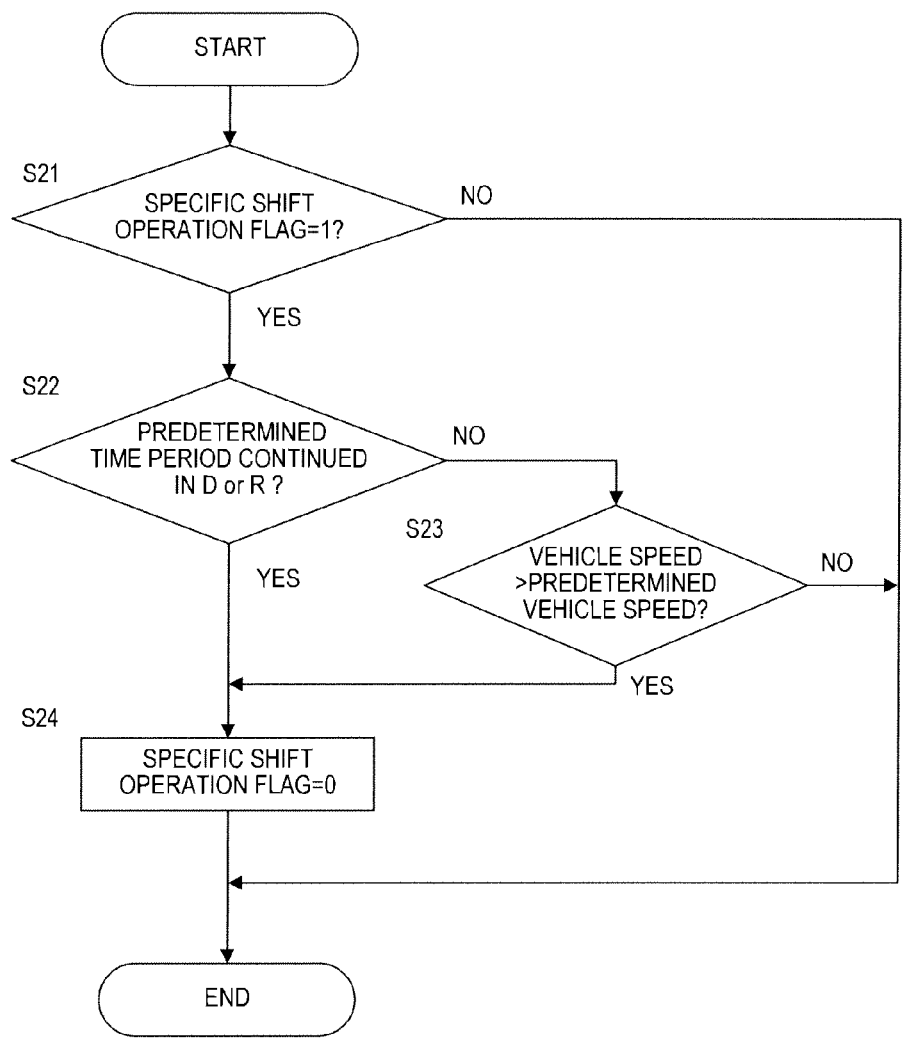
FIG. 4 is a flow chart showing the substance of judgment processing judging the end of the specific shift operation and which the transmission controller performs.
Figure 5:
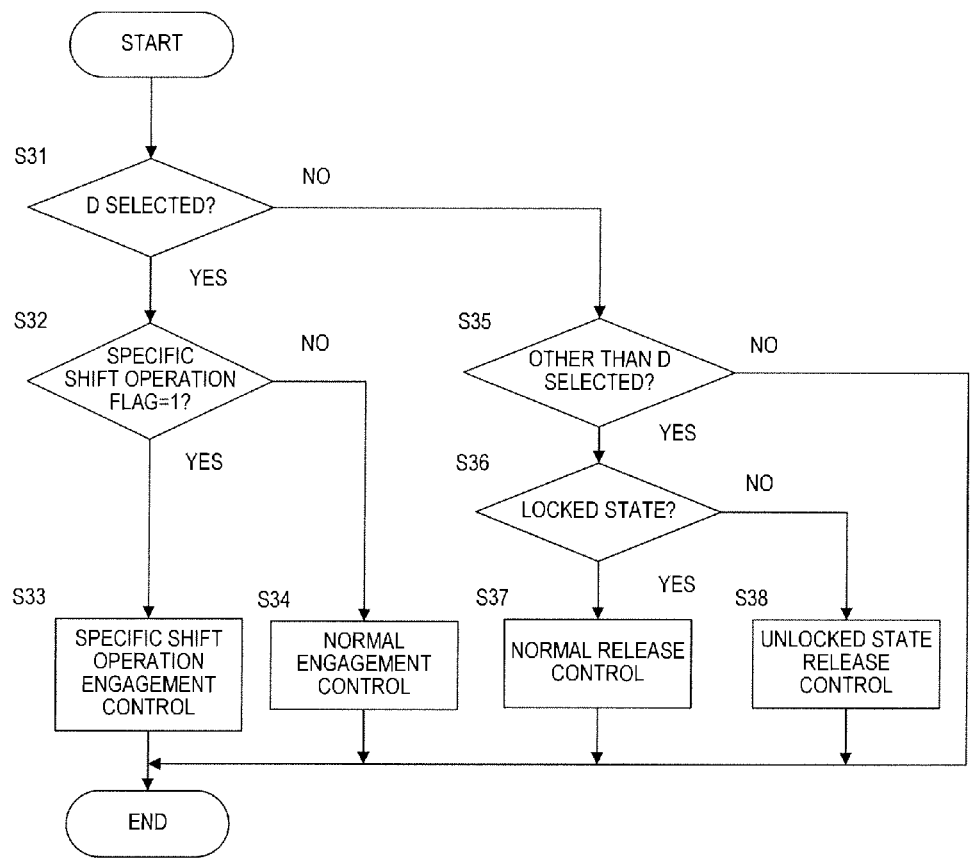
FIG. 5 is a flow chart showing the substance of the engagement/release processing, which the transmission controller performs, of a forward clutch.

A description is now given of the substance of control by the transmission controller 9 with reference to FIGS. 3 to 5.

FIG. 3 is a flow chart showing the substance of judgment processing judging the start of the specific shift operation and which the transmission controller 9 performs.

According to this flow chart, in S11, the transmission controller 9 compares the previous value and the current value of the mode of the transmission 3 selected by the select switch 11, and determines whether or not the mode of the transmission 3 was switched from the D-mode to the R-mode. When the mode of the transmission 3 was switched from the D-mode to the R-mode, the processing proceeds to S12, and when this is not the case, the processing proceeds to S13.

In S12, the transmission controller 9 starts a timer. This timer is provided for measuring elapsed time from a point in time when the mode of the transmission 3 was switched from the D-mode to the R-mode.

In S13, the transmission controller 9 compares the previous value and the current value of the mode of the transmission 3 selected by the select switch 11, and determines whether the mode of the transmission 3 was switched from the R-mode to the D-mode. When the mode of the transmission 3 was switched from the R-mode to the D-mode, the processing proceeds to S14, and when this is not the case, the processing ends.

In S14, the transmission controller 9 compares a timer value, which corresponds to a time interval from a point in time when the mode of the transmission 3 was switched from the D-mode to the R-mode to a point in time when the mode of the transmission 3 was switched from the R-mode to the D-mode, and a specific-shift-operation judgment value. The specific-shift-operation judgment value is set to a predetermined short time period during which judgment can be made on whether or not the interlock of the transmission 3 arises due to the mode switching of the transmission 3, and is set to, for example, the lower limit of a time period during which the forward clutch 5 is released, even if the cancellation of the locking mechanism BL is delayed due to the residual pressure of a hydraulic pressure for actuating the locking mechanism BL. When the timer value is smaller than the specific-shift-operation judgment value, the processing proceeds to S15, and when this is not the case, the processing ends.

In S15, the transmission controller 9 sets a numeral "1" for a specific-shift-operation flag, which indicates that the specific shift operation was performed.

Therefore, according to the judgment processing judging the start of the specific shift operation mentioned above, based on the time interval of the mode switching of the transmission 3, judgment is made on whether or not the specific shift operation was performed (S14); when it is determined that the specific shift operation was performed, the numeral "1" is set for the specific-shift-operation flag (S15).

FIG. 4 is a flow chart showing the substance of judgment processing judging the end of the specific shift operation that the transmission controller 9 performs.

According to this flow chart, in S21, the transmission controller 9 judges whether or not the value of the specific-shift-operation flag is the numeral "1." When the value of the specific-shift-operation flag is the numeral "1," the processing proceeds to S22, and when this is not the case, the processing ends.

In S22, the transmission controller 9 determines whether or not the mode of the transmission 3 has continued in the state of the D-mode or the R-mode for a time period longer than a predetermined time period. The predetermined time period is set to a time period which is long enough to be able to judge that garaging is not happening, and is 30 seconds for the D-mode and 40 seconds for the R-mode, for example. Since the mode of the transmission 3 is generally switched in a short time period in garaging, it is possible to judge that garaging is not happening by watching whether or not a same mode continues. When it is judged that the mode of the transmission 3 has continued in the D-mode or the R-mode for a time period longer than the predetermined time period, the processing proceeds to S24, and when this is not the case, the processing proceeds to S23.

In S23, the transmission controller 9 judges whether or not a vehicle speed is higher than a predetermined vehicle speed. The predetermined vehicle speed is set to a vehicle speed from which it is possible to judge that garaging is not happening, and is set to, for example, 10 km/h which is a typical slowdown vehicle speed. Since garaging is generally performed at a speed slower than the slowdown vehicle speed, it is possible to judge that garaging is not happening, by watching whether or not the vehicle speed is higher than the predetermined vehicle speed. When it is judged that the vehicle speed is higher than the predetermined vehicle speed, the processing proceeds to S24, and when this is not the case, the processing ends.

In S24, the transmission controller 9 resets the specific-shift-operation flag to a numeral "0."

Therefore, according to the judgment processing judging the end of the specific shift operation mentioned above, even when it is determined that the specific shift operation was performed by the judgment processing judging the start of the specific shift operation, if the mode of the transmission 3 has continued in the D-mode or in the R-mode for a time period longer than the predetermined time period (S22: YES) or if the vehicle speed has become higher than the predetermined vehicle speed (S23: YES), the specific-shift-operation flag is reset to the numeral "0" (S24) based on the judgment that garaging is not happening.

FIG. 5 is a flow chart showing the content of the engagement/release processing, which the transmission controller 9 performs, of the forward clutch 5.

According to this flow chart, in S31, the transmission controller 9 compares the previous value and the current value of the mode of the transmission 3 selected by the select switch 11, and judges whether or not the D-mode was selected as the mode of the transmission 3. When the D-mode was selected, the processing proceeds to S32, and when this is not the case, the processing proceeds to S35.

In S32, the transmission controller 9 judges the value of the specific-shift-operation flag. When the value of the specific-shift-operation flag is the numeral "1," the processing proceeds to S33, and the specific-shift-operation engagement control is performed. When the value of the specific-shift-operation flag is the numeral "0," the processing proceeds to S34, and the normal engagement control is performed.

In S35, the transmission controller 9 compares the previous value and the present value of the mode of the transmission 3 selected by the select switch 11, and judges whether or not a mode other than the D-mode was selected as the mode of the transmission 3. When a mode other than D-mode was selected, the processing proceeds to S36. When this is not the case, the processing ends.

In S36, the transmission controller 9 judges whether or not the locking mechanism BL is in the locked state. When the locking mechanism is in the locked state, the processing proceeds to S37 and the normal release control is performed. When the locking mechanism BL is in the unlocked state, the processing proceeds to S38 and the unlocked-state release control is performed. Whether or not the locking mechanism BL is in the locked state can be judged, based on whether the forward clutch 5 is engaged in normal engagement control (S34) or the specific-shift-operation engagement control (S33).

Or, whether or not the locking mechanism BL is in the locked state may be judged, based on the change of the ON-pressure (the change of a hydraulic pressure with the ball holding piston 67 stroking) when the normal engagement control (S34) or the specific-shift-operation engagement control (S33) is performed.

Therefore, according to the engagement/release processing of the forward clutch 5 mentioned above, it is judged that the specific shift operation was performed by the judgment processing judging the start of the specific shift operation; then, when the D-mode is selected as the mode of the transmission 3 (S31: YES, S32: YES), the specific-shift-operation engagement control, not the normal engagement control, is performed (S33).

Next, the working effect of this embodiment will be described.

When there is performed the specific shift operation for garaging etc. where the mode of the transmission 3 is alternately switched between the D-mode (corresponding to the first driving mode) and the R-mode (corresponding to the second driving mode), there is a possibility that the mode of the transmission 3 is switched to the R-mode a short time after the D-mode is selected as the mode of the transmission 3. When the mode of the transmission 3 is switched to the R-mode, the OFF-pressure for cancelling the locking mechanism BL is supplied to the OFF-pressure piston chamber 63; however, if there is a residual pressure of the ON-pressure supplied to the ON-pressure piston chamber 62 at the time of selecting the D-mode, the residual pressure acts as resistance and delays the cancellation of the locking mechanism BL, which delays the release of the forward clutch 5. In this case, the reverse brake 4 is engaged before the forward clutch 5 is released, and the interlock of the transmission 3 arises.

However, in the present embodiment, it is determined that the specific shift operation was performed by the judgment processing judging the start of the specific shift operation; then, when the D-mode is selected as the mode of the transmission 3, the specific-shift-operation engagement control (S33), not the normal engagement control, is performed. That is, by continuously supplying a hydraulic pressure lower than the lock pressure to the ON-pressure piston chamber 62, the forward clutch 5 is maintained in the engaged state with the locking mechanism BL not being brought into the locked state.

Thereby, even if the mode of the transmission 3 is switched to the R-mode a short time after that, it is unnecessary to supply the OFF-pressure to the OFF-pressure piston chamber 63 in order to release the locking mechanism BL, and the forward clutch 5 can be released promptly by only draining the hydraulic pressure of the ON-pressure piston chamber 62 (S38). That is, there arises no delay in the cancellation of the locking mechanism BL. Therefore, the forward clutch 5 can be released before the reverse brake 4 is engaged, which can prevent interlock from occurring in the transmission 3.

Moreover, since whether or not the specific shift operation was performed is determined based on the time interval of switching the mode of the transmission 3, it is possible to judge whether or not the specific shift operation was performed, with ease and high precision.

This concludes the description of the embodiment of the present invention. It should be noted that the above-described embodiment merely represents a part of application examples of the present invention, and is not intended to limit a technical scope of the present invention to specific configurations of the above-described embodiment.

For example, in the above-described embodiment, the supply of the hydraulic pressure to the ON pressure piston chamber 62 is stopped after the lock mechanism BL is placed in the locked state. However, it is possible to adopt a configuration in which the hydraulic pressure in the ON pressure piston chamber 62 is lowered without stopping the supply. Similarly, in the above-described embodiment, the supply of the hydraulic pressure to the OFF pressure piston chamber 63 is stopped after the lock mechanism BL is placed in the unlocked state. However, it is possible to adopt a configuration in which the hydraulic pressure in the OFF pressure piston chamber 63 is lowered without stopping the supply.

Furthermore, for example, the specific configuration of the forward clutch 5 shown in FIG. 2 is an example of a friction element having a lock mechanism attached thereto. The present invention is also applicable to a friction element having a lock mechanism attached thereto and having a configuration other than this specific configuration.

Moreover, although the forward clutch 5 is used as the friction element with the locking mechanism in the embodiment mentioned above, the reverse brake 4 may be used as the friction element with the locking mechanism. In this case, in order to prevent interlock from occurring in the transmission 3 at the time of the specific shift operation, when it is judged that the specific shift operation was performed and then the R-mode is selected as the mode of the transmission 3, there should be performed the specific-shift-operation engagement control for the reverse brake 4. In this case, the R-mode corresponds to the first driving mode, and the D-mode corresponds to the second driving mode.

Moreover, a method that determines whether or not the specific shift operation was performed is not limited to the judgment which is based on the time interval of switching the mode of the transmission 3. For example, if the specific shift operation is a shift operation during garaging, judgment may be made based on navigation information, vehicle speed information, and the like.

This application claims for priority based on Japanese Patent Application NO. 2012-212182 filed on Sep. 26, 2012, the entire content of which is herein incorporated by reference.

The invention claimed is:

1. An automatic transmission comprising:
a first friction element, which is arranged on a power transmission path, and in which a locking mechanism is brought into a locked state when an ON-pressure is supplied to an engagement-side oil chamber, and in which an engaged state is maintained even if a hydraulic pressure of the engagement-side oil chamber is lowered when the locking mechanism has been brought into the locked state, and in which the locking mechanism is brought into an unlocked state when an OFF-pressure is supplied to a release-side oil chamber, and in which a released state is maintained even if a hydraulic pressure of the release-side oil chamber is lowered when the locking mechanism has been brought into the unlocked state;
a second friction element, which is arranged on the power transmission path, and in which switching between an engaged state and a released state is controlled by hydraulic pressure, the automatic transmission being in an interlocked state if the first friction element and the second friction element are engaged simultaneously;
a select switch structured to select a first driving mode or a second driving mode, a traveling direction of which is opposite to a traveling direction of the first driving mode, as a mode of the automatic transmission; and
a control device, which engages the first friction element and releases the second friction element by controlling a hydraulic pressure supplied to the first friction element and the second friction element when the first driving mode is selected by the select switch, and which releases the first friction element and engages the second friction element by controlling a hydraulic pressure supplied to the first friction element and the second friction element when the second driving mode is selected by the select switch,
wherein the control device judges whether or not there was performed a specific shift operation where the mode of the automatic transmission is alternately switched by the select switch between the first driving mode and the second driving mode, and when it is judged that the specific shift operation was performed, and when the first friction element is engaged, the first friction element is brought into the engaged state without bringing the locking mechanism into the locked state by supplying a hydraulic pressure, which is lower than a lock pressure with which the locking mechanism is brought into the locked state, to the engagement-side oil chamber.

2. The automatic transmission according to claim 1, wherein
the control device judges whether or not the specific shift operation was performed, based on a time interval of switching a mode of the automatic transmission.

3. A method for controlling an automatic transmission, the automatic transmission having:
a first friction element, which is arranged on a power transmission path, and in which a locking mechanism is brought into a locked state when an ON-pressure is supplied to an engagement-side oil chamber, and in which an engaged state is maintained even if a hydraulic pressure of the engagement-side oil chamber is lowered when the locking mechanism has been brought into the locked state, and in which the locking mechanism is brought into an unlocked state when an OFF-pressure is supplied to a release-side oil chamber, and in which a released state is maintained even if a hydraulic pressure of the release-side oil chamber is lowered when the locking mechanism has been brought into the unlocked state;
a second friction element, which is arranged on the power transmission path, and in which switching between an engaged state and a released state is controlled by hydraulic pressure, the automatic transmission being in an interlocked state if the first friction element and the second friction element are engaged simultaneously; and
a select switch structured to select a first driving mode or a second driving mode, a traveling direction of which is opposite to a traveling direction of the first driving mode, as a mode of the automatic transmission;

the method comprising:

engaging the first friction element and releasing the second friction element by controlling a hydraulic pressure supplied to the first friction element and the second friction element when the first driving mode is selected by the select switch;

releasing the first friction element and engaging the second friction element by controlling a hydraulic pressure supplied to the first friction element and the second friction element when the second driving mode is selected by the select switch;

judging whether or not there was performed a specific shift operation where a mode of the automatic transmission is alternately switched by the select switch between the first driving mode and the second driving mode;

bringing the first friction element into the engaged state without bringing the locking mechanism into the locked state by supplying a hydraulic pressure, which is lower than a lock pressure with which the locking mechanism is brought into the locked state, to the engagement-side oil chamber when the first friction element is engaged and when it is judged that the specific shift operation was performed.

4. An automatic transmission comprising:

a first friction element, which is arranged on a power transmission path, and in which a locking mechanism is brought into a locked state when an ON-pressure is supplied to an engagement-side oil chamber, and in which an engaged state is maintained even if a hydraulic pressure of the engagement-side oil chamber is lowered when the locking mechanism has been brought into the locked state, and in which the locking mechanism is brought into an unlocked state when an OFF-pressure is supplied to a release-side oil chamber, and in which a released state is maintained even if a hydraulic pressure of the release-side oil chamber is lowered when the locking mechanism has been brought into the unlocked state;

a second friction element, which is arranged on the power transmission path, and in which switching between an engaged state and a released state is controlled by hydraulic pressure, the automatic transmission being in an interlocked state if the first friction element and the second friction element are engaged simultaneously;

a select switch structured to select a first driving mode or a second driving mode, a traveling direction of which is opposite to a traveling direction of the first driving mode, as a mode of the automatic transmission; and control means for engaging the first friction element and releasing the second friction element by controlling a hydraulic pressure supplied to the first friction element and the second friction element when the first driving mode is selected by the select switch, and releasing the first friction element and engaging the second friction element by controlling a hydraulic pressure supplied to the first friction element and the second friction element when the second driving mode is selected by the select switch, wherein the control means judges whether or not there was performed a specific shift operation where the mode of the automatic transmission is alternately switched by the select switch between the first driving mode and the second driving mode, and when it is judged that the specific shift operation was performed, and when the first friction element is engaged, the first friction element is brought into the engaged state without bringing the locking mechanism into the locked state by supplying a hydraulic pressure, which is lower than a lock pressure with which the locking mechanism is brought into the locked state, to the engagement-side oil chamber.

* * * * *